(12) United States Patent
Shim (10) Patent No.: US 12,261,425 B2
(45) Date of Patent: Mar. 25, 2025

(54) CABLE HOLDER (71) Applicant: APLUSX INC., Gyeonggi-do (KR)

(72) Inventor: Kun Hee Shim, Seoul (KR)

(73) Assignee: APLUSX INC., Gyeonggi-do (KR)

( * ) Notice: Subject to any disclaimer, the term of this patent is extended or adjusted under 35 U.S.C. 154(b) by 0 days.

(21) Appl. No.: 18/352,306

(22) Filed: Jul. 14, 2023

(65) Prior Publication Data
US 2024/0413621 A1 Dec. 12, 2024

(30) Foreign Application Priority Data
Jun. 7, 2023 (KR) .................. 10-2023-0072821

(51) Int. Cl.
H02G 3/04 (2006.01)
(52) U.S. Cl.
CPC ................. H02G 3/0456 (2013.01)
(58) Field of Classification Search
CPC ...... H02G 11/00; H02G 3/0456; H02G 3/305;
H02G 3/32; F16B 2/22; F16G 11/10;
G06F 3/039
USPC ................... 248/73, 51, 49, 58, 65
See application file for complete search history.

(56) References Cited

U.S. PATENT DOCUMENTS

| 3,233,930 | A | * | 2/1966 | Becker | F16C 11/04 403/163 |
| 4,842,237 | A | * | 6/1989 | Wollar | H02G 3/26 248/548 |
| 5,093,964 | A | * | 3/1992 | Rowland | B65H 75/366 24/17 AP |
| 5,398,530 | A | * | 3/1995 | Derman | H01R 13/6397 70/58 |
| 5,709,498 | A | * | 1/1998 | Sova | E05B 79/12 403/163 |
| 6,905,279 | B2 | * | 6/2005 | Metzger | F16G 11/10 403/282 |
| 7,317,446 | B1 | * | 1/2008 | Murphy | G06F 3/03543 345/157 |
| 7,854,413 | B2 | * | 12/2010 | Yamamoto | F16L 3/015 296/146.7 |
| 8,093,501 | B2 | * | 1/2012 | Stansberry, Jr. | H02G 7/05 174/148 |
| 9,634,472 | B2 | * | 4/2017 | Kaml | H02G 3/08 |
| 11,146,029 | B1 | * | 10/2021 | Shaffer | H01R 13/6395 |
| 11,374,532 | B2 | * | 6/2022 | McPheeters | F16L 3/24 |
| 11,696,639 | B2 | * | 7/2023 | Cvek | H02G 3/34 439/532 |
| 2006/0027716 | A1 | * | 2/2006 | Walz | F16B 12/2036 248/73 |
| 2015/0165985 | A1 | * | 6/2015 | Morris | B60R 16/0215 248/65 |
| 2018/0145490 | A1 | * | 5/2018 | Guinta | H02G 3/22 |
| 2021/0254758 | A1 | * | 8/2021 | Goettle | F16L 3/243 |

FOREIGN PATENT DOCUMENTS

KR 2020170000024 U 1/2017
KR 102487568 B1 1/2023

* cited by examiner

Primary Examiner — Eret C McNichols
Assistant Examiner — Michael McDuffie
(74) Attorney, Agent, or Firm — AVEK IP, LLC (57) ABSTRACT The present invention relates to a cable holder including: a base having a flat top; a connector connected to the underside of the base that is opposite to the top of the base and rotatable around the base; and a body inserted into the connector and separably coupled to the connector to pass a cable therethrough.

16 Claims, 5 Drawing Sheets

CABLE HOLDER

CROSS REFERENCE TO RELATED APPLICATION OF THE INVENTION

The present application claims the benefit of Korean Patent Application No. 10-2023-0072821 filed in the Korean Intellectual Property Office on Jun. 7, 2023, the entire contents of which are incorporated herein by reference.

BACKGROUND OF THE INVENTION

Field of the Invention

The present invention relates to a cable holder, more specifically to a cable holder that is capable of allowing a computer peripheral device such as a mouse, a keyboard, or the like to freely move, while minimizing inconveniences caused by the cable of the computer peripheral device.

Background of the Related Art

A mouse as well as a keyboard, which is one of computer peripheral devices, is generally used to control cursor motions on the screen of a monitor. The mouse may be divided into a wired mouse with a cable and a non-wired mouse with no cable.

The wired mouse is connected to a computer body by means of the cable. In this case, the cable is disposed at the front portion of the mouse and thus connected to the computer body, and two or three buttons are located on top of the front portion of the mouse. Further, a ball or a sensor for sensing light is located on the underside of the mouse.

In specific, the cable of the wired mouse has a length of 1 to 1.2 m, is freely deformable, and thus hangs loose in a state of connecting the mouse with the computer body. If the mouse and the computer body are disposed on a desk or table, further, the cable may come into contact with the desk or table or move according to the movements of the mouse, while being not fixed in position. If the mouse is used for long hours in such a state, it may be hard on a user's wrist. In specific, if high mouse sensitivity is needed for performing electronic-sports, online games, graphics works, and the like, the mouse may not move gently according to the user's intention or erroneously work due to the interruption of the cable, thereby undesirably causing unsatisfied work results.

SUMMARY OF THE INVENTION

Accordingly, the present invention has been made in view of the above-mentioned problems occurring in the related art, and it is an object of the present invention to provide a cable holder that is capable of minimizing the contact of a cable of a computer peripheral device, especially a mouse with another object.

It is another object of the present invention to provide a cable holder that is capable of reducing tension applied to a cable when a mouse moves, thereby enabling the cable to be kept stably in a mounted state thereonto.

It is yet another object of the present invention to provide a cable holder that is capable of allowing a mouse to freely move in an extended motion range.

To accomplish the above-mentioned objects, according to the present invention, there is provided a cable holder including: a base having a flat top; a connector connected to the underside of the base that is opposite to the top of the base and rotatable around the base; and a body inserted into the connector and separably coupled to the connector to pass a cable therethrough.

According to the present invention, desirably, the base may include: a cylindrical base body having a cylindrical connection space portion concavely formed on top thereof, a circular connection opening formed on underside thereof to have an inner diameter smaller than an inner diameter of the connection space portion, and a disc-shaped cover space portion formed on top of the connection space portion to have an inner diameter larger than the inner diameter of the connection space portion; and a pair of base auxiliary bodies having the shapes of rods and extending from the outer peripheral surface of the upper end portion of the base body in such a manner as to be located on the same line as each other, top of the base body and tops of the base auxiliary bodies being located on the same plane.

According to the present invention, desirably, the connector may include: a rotation inducing body having the shape of a ball bearing with a hollow portion and accommodated in the connection space portion; and a connection body having the shape of a cylinder corresponding to the base body, connected to the rotation inducing body and thus located on the underside of the base body, and separably coupling the body thereto, the connection body being rotatable around the base body.

According to the present invention, desirably, the connection body may include connection inducing bodies protruding from top thereof and spaced apart from each other in parallel with each other, and the connection inducing bodies may pass through the connection opening and be inserted into the hollow portion of the rotation inducing body and coupled to the rotation inducing body, so that top of the connection body comes into contact with the underside of the base body, and the connection body rotates around the connection inducing bodies.

According to the present invention, desirably, the connection body may include a coupling space portion formed therein to pass through the outer peripheral surface of the lower end portion thereof and a coupling opening formed on the underside thereof and thus connected to the coupling space portion, and the body may include: a tube-shaped mounting body passing through the coupling space portion and having a mounting space portion formed therein to pass through both ends of the mounting body in such a manner as to pass the cable therethrough and a mounting opening formed along the mounting space portion on the outer peripheral surface of the mounting body and thus connected to the mounting space portion; a coupling inducing body protruding from the outer peripheral surface of a first end portion of the mounting body in such a way as to be located on the opposite side to the mounting opening; and a pair of coupling auxiliary bodies spaced apart from each other and protruding from the outer peripheral surface of the mounting body in a circumferential direction of the mounting body to connect both sides of the coupling inducing body, whereby when the first end portion of the mounting body is inserted into the coupling space portion, the coupling inducing body may be fixedly inserted into the coupling opening, and the coupling auxiliary bodies may come into contact with the inner sides of the coupling opening.

According to the present invention, desirably, the body may be made of an elastic material and when the cable passes through the mounting opening, the body may be deformed in such a way as to increase a width of the mounting opening.

According to the present invention, desirably, the base may further include a disc-shaped base cover inserted into the cover space portion and thus located on the bottom of the cover space portion, so that in a state where the rotation inducing body is accommodated in the connection space portion, the base cover may be located on the bottom of the cover space portion and the top of the rotation inducing body, and the base auxiliary bodies may include plate-shaped auxiliary space portions concavely formed on tops thereof, connected to the cover space portion, and having the undersides located higher than the bottom of the cover space portion, so that when the base cover is located on the bottom of the cover space portion, top of the base cover may be located on the same plane with the undersides of the auxiliary space portions.

According to the present invention, desirably, the cable holder may further include an installation part located on top of the base and having given adhesion to allow the base to be fixed to the underside of a monitor, whereby the cable passes through the body coupled to the connector, is spaced apart from top of an object on which the monitor is installed, and is movable along the body or rotates around the base.

According to the present invention, desirably, the cable holder may further include a guide part extending from the outer peripheral surface of the upper end portion of the connection body and located parallel with the body, whereby in a state where the cable passes through the body and the body is separably coupled to the connector, the guide part may be located along the circumferential directions of the cable and the body to support the cable and the body through the contact with the body from a state of being spaced apart from the body.

According to the present invention, desirably, the guide part may include: a bar-shaped guide base having a first end surface fixedly coming into contact with the outer peripheral surface of the connection body above the coupling space portion, extending from the outer peripheral surface of the upper end portion of the connection body, and located in the same direction as the coupling opening; a guide wire having a given length and configured to have a first end fixed to the underside of the guide base, a first end portion located on the underside of the guide base to move along the circumferential direction of the middle portion of the mounting body, and a second end portion opposite to the first end portion in such a way as to be movable along the interior of the guide base and protrude from a second end surface of the guide base opposite to the first end surface of the guide base; and a support guide made of an elastic material, having the shape of a circular band, and connecting a second end of the guide wire to the outer peripheral surface thereof, so that in a state where the base is attached to the underside of the monitor, the first end portion of the mounting body of the body is inserted into the coupling space portion to allow the first end portion of the guide wire to be located along the circumferential direction of the mounting body in a state of being spaced apart from the outer peripheral surface of the mounting body and to allow the support guide to be spaced apart from the second end surface of the mounting body, while facing the second end surface of the mounting body, and in the state where the cable passes through the support guide and the mounting body through the mounting space portion and the first end portion of the mounting body is inserted into the coupling space portion, the cable protruding from the second end surface of the mounting body sags down to allow the support guide to move down by means of the cable to thus pull down the second end portion of the guide wire in such a way that the second end portion of the guide wire protrudes longer from the second end surface of the guide base and the first end portion of the guide wire is more inserted into the guide base by means of the second end portion of the guide wire and thus comes into contact with the outer peripheral surface of the mounting body in such a way as to be located along the circumferential direction of the mounting body.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

If it is determined that the detailed explanation on the well-known technology related to the present invention makes the scope of the present invention not clear, the explanation will be avoided for the brevity of the description. Terms, ordinal numbers such as the first, the second, and the like may be used to describe various elements, but the elements should not be restricted by the terms. The terms are used to only distinguish one element from the other element.

In the description, when it is said that one element is described as being "connected" or "coupled" to the other element, one element may be directly connected or coupled to the other element, but it should be understood that another element may be present between the two elements.

In the description, further, the term "part" described in the specification indicates two or more parts that are combined to one part or one part that is divided into two or more parts according to more specified functions. Moreover, the respective parts as will be discussed in the specification can additionally perform some or all of functions performed by other parts as well as their main functions, and of course, also, some of the main functions of the respective parts can be performed only by other parts.

Hereinafter, the present invention will be described in detail with reference to the attached drawings.

Figure 1:
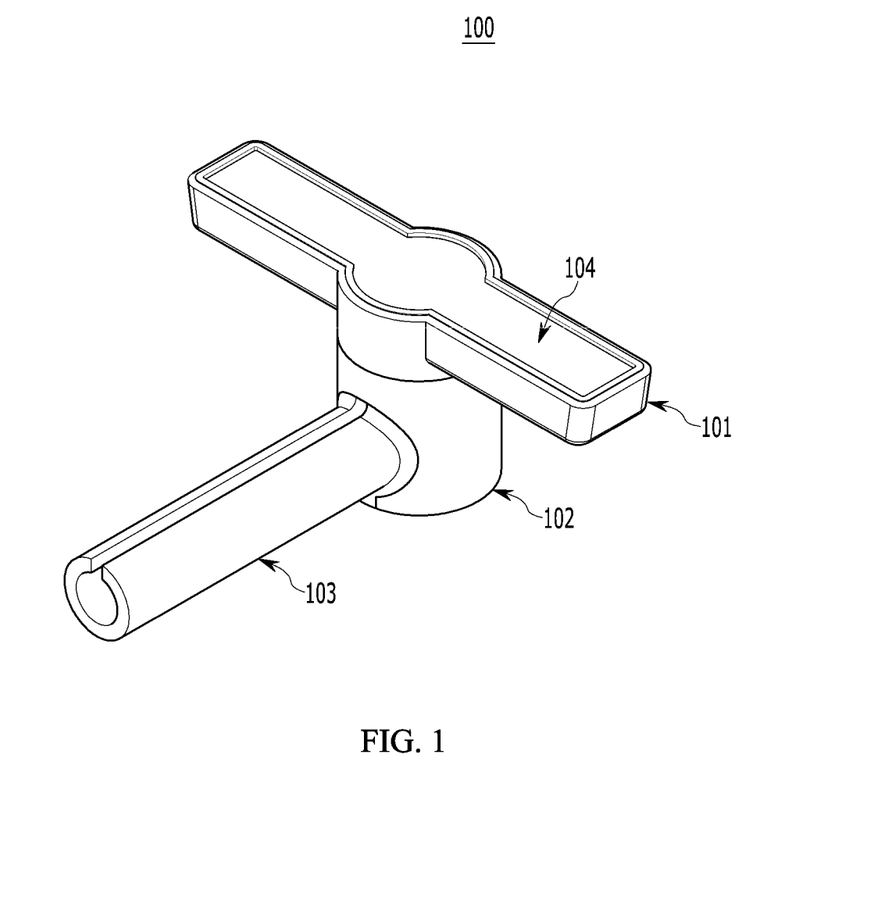
FIG. 1 is a perspective view showing a cable holder according to a first embodiment of the present invention.
Figure 2:
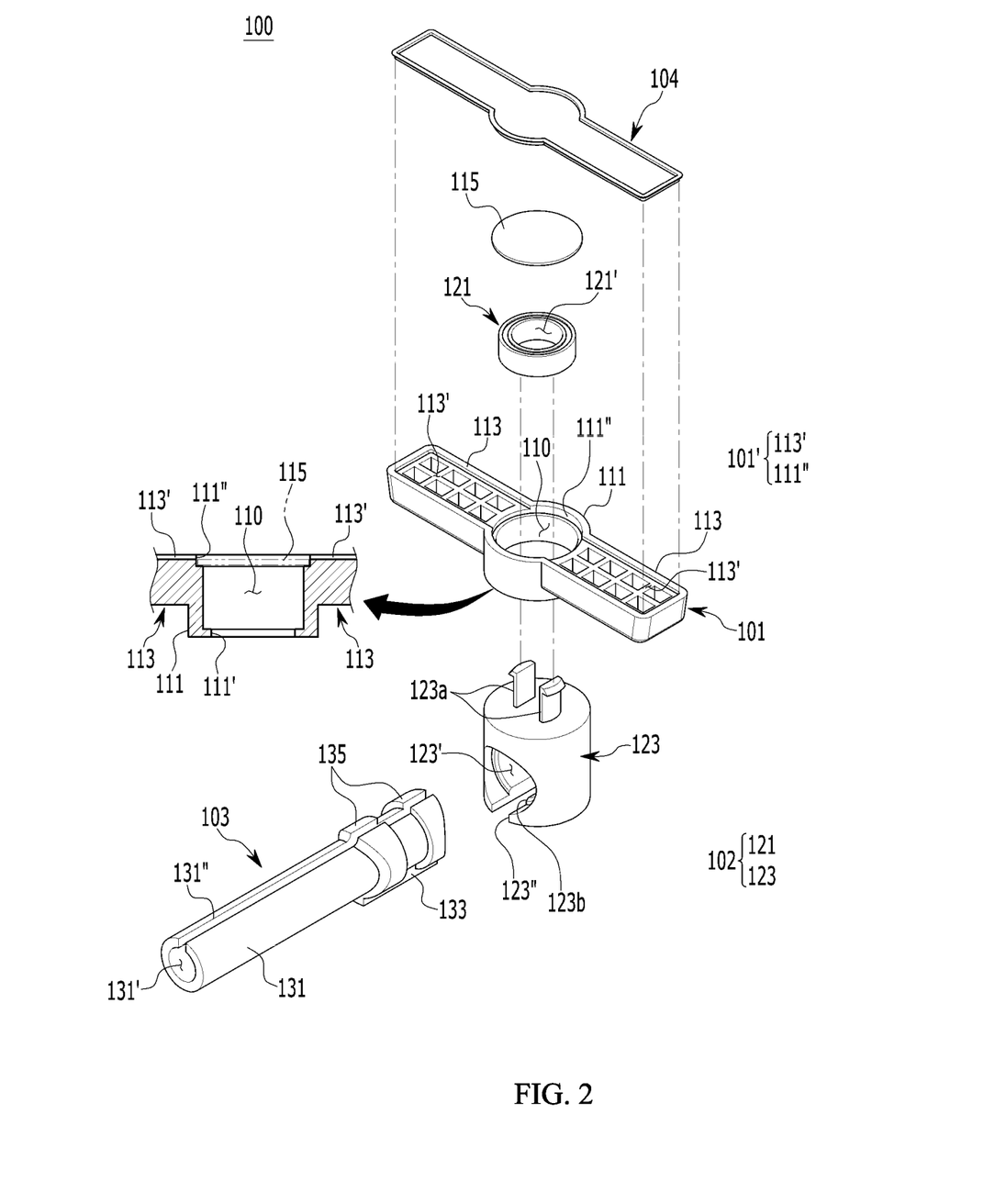
FIG. 2 is an exploded perspective view showing the cable holder according to the first embodiment of the present invention.
Figure 3:
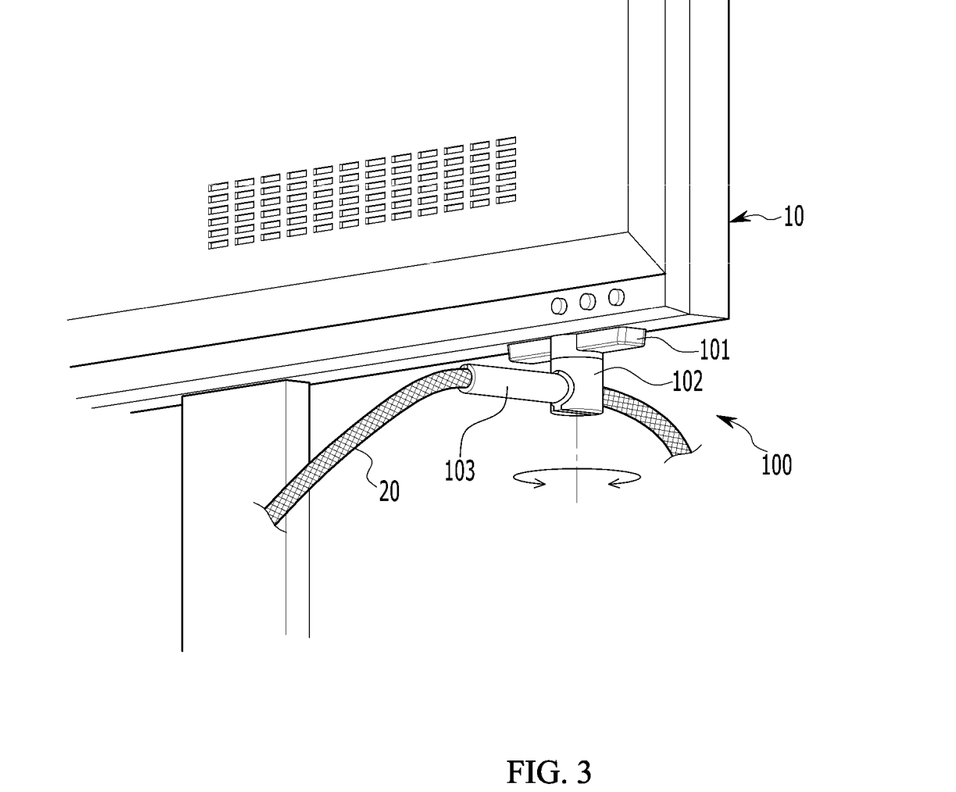
FIG. 3 is an exemplary view showing a state in which the cable holder according to the first embodiment of the present invention is mounted onto a monitor.

FIG. 1 is a perspective view showing a cable holder according to a first embodiment of the present invention, FIG. 2 is an exploded perspective view showing the cable holder according to the first embodiment of the present invention, and FIG. 3 is an exemplary view showing a state in which the cable holder according to the first embodiment of the present invention is mounted onto a monitor.

As shown in FIGS. 1 to 3, a cable holder 100 according to the first embodiment of the present invention may include a base 101, a connector 102, a body 103, and an installation part 104, and the cable holder 100 may be attached to a computer body or monitor 10, so that it may be coupled to a cable 20 of a computer peripheral device such as a mouse, a keyboard, or the like connected to the computer body and thus located on a desk or table.

Further, the cable holder 100 according to the first embodiment of the present invention may be desirably coupled to the cable 20 of a mouse requiring a relatively large number of motions, and accordingly, the cable holder 100 may be used to allow the cable 20 to be spaced apart from top of the desk or table where the monitor 10 is located.

The base 101 may have the shape of a flat plate with a flat top and may be attached to the computer body or monitor 10 in such a way that it may be spaced apart from top of the desk or table. According to the first embodiment of the present invention, top of the base 101 may be located to come into contact with the monitor 10, particularly the underside of the monitor 10.

Further, the base 101 may include a base body 111, base auxiliary bodies 113, and a base cover 115.

The base body 111 may be cylindrical and may include a connection space portion 110, a connection opening 111', and a cover space portion 111".

The connection space portion 110 may have the shape of a cylinder corresponding to the base body 111 and may be concavely formed on top of the base body 111.

The connection opening 111' may be circular and formed on the underside of the base body 111 to open the underside of the base body 111. In this case, an inner diameter of the connection opening 111' may be smaller than an inner diameter of the connection space portion 110.

The cover space portion 111" may have the shape of a disc and may be formed on top of the connection space portion 110 of the base body 111. In this case, an inner diameter of the cover space portion 111" may be larger than the inner diameter of the connection space portion 110.

The base auxiliary bodies 113 may be provided in pair and may have the shapes of rods. Further, the pair of base auxiliary bodies 113 may extend from the outer peripheral surface of the upper end portion of the base body 111 so that they may be located on the same line. That is, the base auxiliary bodies 113 may be symmetrically located with respect to the base body 111. In this case, top of the base body 111 and tops of the base auxiliary bodies 113 may be located on the same plane.

Further, the base auxiliary bodies 113 may have auxiliary space portions 113a concavely formed on tops thereof. The auxiliary space portions 113' may have the shapes of plates corresponding to the base auxiliary bodies 113 in such a way as to be connected to the cover space portion 111". Further, the undersides of the auxiliary space portions 113' may be located higher than the underside of the cover space portion 111".

The base cover 115 may have the shape of a disc and may be located on the base body 111 to block the connection space portion 110. In this case, the base cover 115 may be inserted into the cover space portion 111" and thus located on the bottom of the cover space portion 111". Further, top of the base cover 115 may be located lower than top of the base body 111, while being placed on the same plane with the undersides of the auxiliary space portions 113'.

Further, a fixing space portion 101', which is formed by combining the cover space portion 111" and the auxiliary space portions 113', may be formed on top of the base 101, and the underside of the fixing space portion 101' may be defined by the base cover 115 and the undersides of the auxiliary space portions 113'.

The connector 102 may be rotatably connected to the underside of the base 101 that is opposite to top of the base 101. In specific, the connector 102 may be located on the underside of the base body 111 of the base 101 and rotatable around the base body 111. Further, the connector 102 may include a rotation inducing body 121 and a connection body 123.

The rotation inducing body 121 may have the shape of a ball bearing with a hollow portion 121' and may be accommodated in the connection space portion 110. In this case, the rotation inducing body 121 may be located on the bottom of the connection space portion 110, and the hollow portion 121' may be located to correspond to the connection opening 111'.

When the base cover 115 is located on the cover space portion 111" to block the connection space portion 110, the rotation inducing body 121 may be accommodated in the connection space portion 110 and thus located under the base cover 115.

Further, the rotation inducing body 121, which has the shape of the ball bearing, may include an outer ring, an inner ring, and balls. In this case, the inner and outer rings of the rotation inducing body 121 may have the same shape and different inner diameters from each other. The inner ring of the rotation inducing body 121 may be located at the same center as the outer ring at the inside of the outer ring of the rotation inducing body 121 and have the hollow portion 121' formed therein. Further, the balls of the rotation inducing body 121 may be located between the inner ring and the outer ring and thus come into contact therewith.

According to the first embodiment of the present invention, in a state where the rotation inducing body 121 is accommodated in the connection space portion 110, the outer ring of the rotation inducing body 121 may be fixed to the inner peripheral surface of the connection space portion 110, and the inner ring of the rotation inducing body 121 may rotate in the connection space portion 110.

The connection body 123 may have the shape of a cylinder corresponding to the base body 111 and may be connected to the rotation inducing body 121 and thus located on the underside of the base body 111. In this case, the connection body 123 may be combined with the rotation inducing body 121 and thus rotate around the base body 111. In specific, the body 103 as will be discussed later may be separably coupled to the connection body 123.

Further, the connection body 123 may include a coupling space portion 123', a coupling opening 123", and connection inducing bodies 123a.

The coupling space portion 123' may be formed to pass through the lower end portion of the outer peripheral surface of the connection body 123. In this case, the cable 20 may pass through the coupling space portion 123'.

The coupling opening 123" may be formed on the underside of the connection body 123 along a diameter of the underside of the connection body 123 corresponding to the coupling space portion 123' and thus connected to the coupling space portion 123'. In specific, the coupling opening 123" may be connected to both ends of the coupling space portion 123'. Further, the cable 20 may pass through the coupling space portion 123' along the coupling opening 123", and when the cable 20 passes through the coupling opening 123", it may not come into contact with the connection body 123.

The connection inducing bodies 123a may be provided in pair and may protrude from top of the connection body 123. In this case, the connection inducing bodies 123a may be symmetrically spaced apart from each other and have the shapes of plates with the curvatures corresponding to the hollow portion 121' of the rotation inducing body 121.

In a state where the rotation inducing body 121 is accommodated in the connection space portion 110 of the base body 111, further, the connection inducing bodies 123a may pass through the connection opening 111' and may be inserted into the hollow portion 121' of the rotation inducing body 121 and thus coupled to the rotation inducing body 121. When the connection inducing bodies 123a are coupled to the rotation inducing body 121, top of the connection body 121 may come into contact with the underside of the base body 111. Further, the connection body 123 may rotate together with the connection inducing bodies 123a in a clockwise or counterclockwise direction around the connection inducing bodies 123a. In this case, the inner ring of the rotation inducing body 121 also may rotate.

The body 103 may be inserted into the connector 102 and separably coupled to the connector 102. In specific, the body 103 may be inserted into the coupling space portion 123' and the coupling opening 123" of the connection body 123 of the connector 102 and coupled to the connection body 123. Further, the cable 20 may be inserted into the body 103 and thus pass through the body 103. In a state where the cable 20 passes through the body 103, the body 103 may be inserted into the coupling space portion 123' in such a way that it can be separably coupled to the connector 102. According to the first embodiment of the present invention, the body 103 may be made of an elastic material such as rubber, silicone, or the like.

Further, the body 103 may include a mounting body 131, a coupling inducing body 133, and coupling auxiliary bodies 135.

The mounting body 131 may have the shape of a tube passing through the coupling space portion 123'. A first end portion of the mounting body 131 may be inserted into the coupling space portion 123'. In this case, the mounting body 131 may be located in a direction along the coupling space portion 123'. Further, the mounting body 131 may include a mounting space portion 131' and a mounting opening 131".

The mounting space portion 131' may be formed on the mounting body 131 in a longitudinal direction of the mounting body 131 to pass through both ends of the mounting body 131. The cable 20 may pass through the mounting space portion 131' and thus come into contact with the inner peripheral surface of the mounting space portion 131'.

The mounting opening 131" may be formed along the mounting space portion 131' on the outer peripheral surface of the mounting body 131 and thus connected to the mounting space portion 131'. In specific, the mounting opening 131" may be connected to both ends of the mounting space portion 131'. The cable 20 may enter the mounting opening 131" and then pass through the mounting space portion 131'.

The coupling inducing body 133 may protrud from the outer peripheral surface of the first end portion of the mounting body 131 in such a way as to be located on the opposite side to the mounting opening 131". In this case, the coupling inducing body 133 may be located on the mounting body 131 in the longitudinal direction of the mounting body 131.

When the first end portion of the mounting body 131 is inserted into the coupling space portion 123', the coupling inducing body 133 may be fixedly inserted into the coupling opening 123". In this case, both sides of the coupling inducing body 133 may come into contact with the inner sides of the coupling opening 123", and a portion of the mounting opening 131" may face the inner peripheral surface of the coupling space portion 123' and be thus closed. Further, a width of the coupling inducing body 133 may be larger than that of the coupling opening 123" so that the coupling inducing body 133 may be compressedly inserted into the coupling opening 123". As a result, the mounting body 131 may not rotate in the state of being inserted into the coupling space portion 123'.

The coupling auxiliary bodies 135 may protrude from the outer peripheral surface of the mounting body 131 in a circumferential direction of the mounting body 131 to connect both sides of the coupling inducing body 133. In this case, the coupling inducing body 133 may protrude outward from the outer peripheral surface of the mounting body 131 more than the coupling auxiliary bodies 135.

When the first end portion of the mounting body 131 is inserted into the coupling space portion 123', the coupling auxiliary bodies 135 may come into contact with the inner peripheral surface of the coupling space portion 123'. As a result, the first end portion of the mounting body 131 may be kept stably inserted into the coupling space portion 123', and the coupling inducing body 133 may be kept stably inserted into the coupling opening 123".

Further, the coupling auxiliary bodies 135 may be provided in pair. When the first end portion of the mounting body 131 is inserted into the coupling space portion 123', the coupling auxiliary bodies 135 may be located spaced apart from each other in the coupling space portion 123' to close the end surface of the coupling space portion 123', while being located on the same surface with the outer peripheral surface of the connection body 123.

Further, a coupling protrusion 123b may protrude from the inner peripheral surface of the coupling space portion 123'. In this case, the coupling protrusion 123b may be located between both ends of the coupling space portion 123'. When the pair of coupling auxiliary bodies 135 spaced apart from each other are located in the coupling space portion 123', the coupling protrusion 123b may be located between the pair of coupling auxiliary bodies 135 and come into contact with the pair of coupling auxiliary bodies 135. As a result, the first end portion of the mounting body 131 may be stably located in the state of being inserted into the coupling space portion 123'.

The installation part 104 may have the shape of a sheet, be adhesive and be fixedly located on top of the base 101. When the installation part 104 is located on the underside of the monitor 10, it can be attached to the underside of the monitor 10 because of its adhesion. In this case, the base 101 may be fixed to the underside of the monitor 10 by means of the installation part 104, and the body 103 may be located under the monitor 10 in the state of being coupled to the connector 102. As a result, the cable 20 may pass through the body 103, be located under the monitor 10, and be thus spaced apart from the desk or table on which the monitor 10 is placed.

Further, the installation part 104 may be inserted into the fixing space portion 101' formed by combining the cover space portion 111" and the auxiliary space portions 113' and thus fixedly located over tops of the base cover 115 and the auxiliary space portions 113'.

According to the first embodiment of the present invention, the cable holder 100 may allow the cable 20 to be spaced apart from the desk or table on which the monitor 10 is placed. In this case, the cable 20 may not come into contact with any object such as the desk or table by means of the cable holder 100, thereby minimizing the contact with another object. As a result, the cable holder 100 according to the first embodiment of the present invention may prevent the friction of the cable 20 with another object such as the desk or table from occurring when the computer peripheral device, especially the mouse connected to the cable 20 moves.

Further, in the state where the cable holder 100 is installed on the underside of the monitor 10, the cable 20 may pass through the body 103 and move along the body 103. Furthermore, the connector 102, which is disposed on the underside of the base 101, may rotate in a clockwise or counterclockwise direction around the base 101, and the cable 20 may pass through the body 103 coupled to the connector 102 and rotate to the left and right sides around the base 101 along the body 103. When the mouse moves, in this case, the tension applied to the cable 20 may be reduced, and further, the force applied to the base 101 may be decreased. As a result, the cable holder 100 according to the first embodiment of the present invention may be kept stably mounted on the underside of the monitor 10 and may extend the motion range of the mouse to permit the mouse to move gently.

Figure 4:
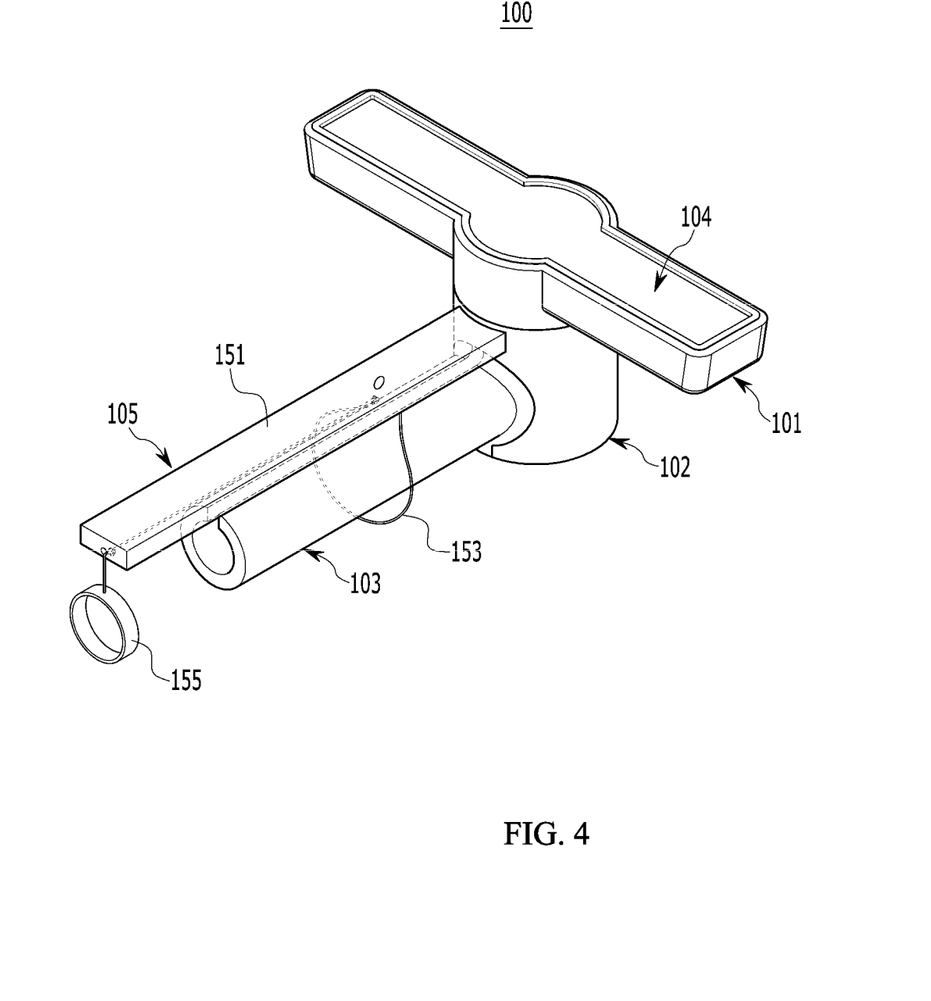
FIG. 4 is a perspective view showing a cable holder according to a second embodiment of the present invention.
Figure 5A:
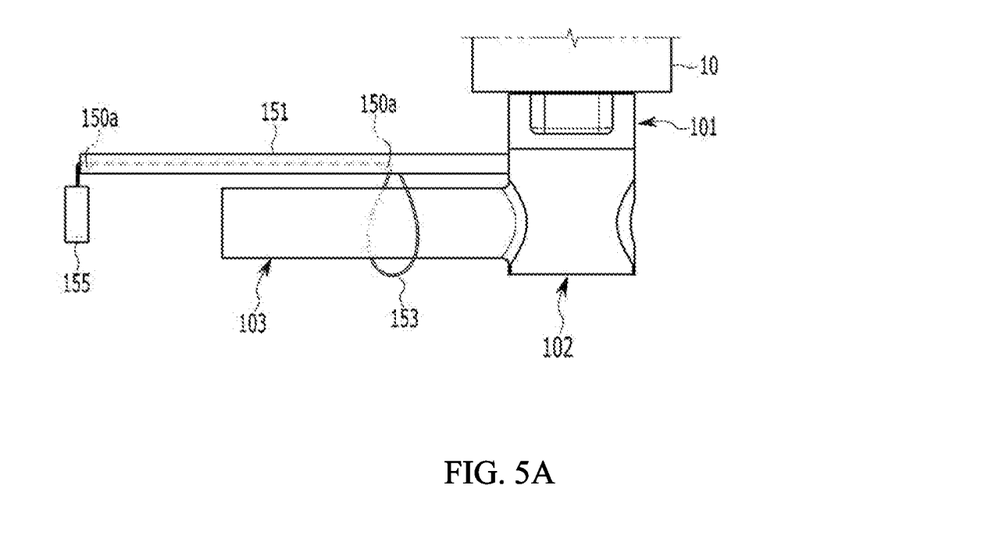
FIGS. 5A and 5B are side views showing the operations of a guide part of the cable holder according to the second embodiment of the present invention.
Figure 5B:
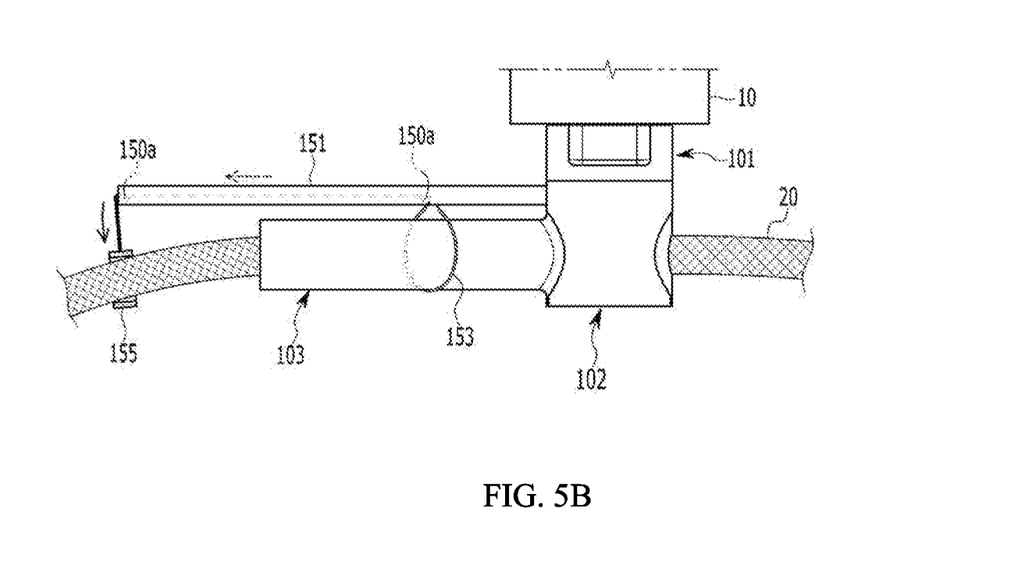

FIG. 4 is a perspective view showing a cable holder according to a second embodiment of the present invention, and FIGS. 5A and 5B are side views showing the operations of a guide part of the cable holder according to the second embodiment of the present invention.

As shown in FIGS. 4 to 5B, the cable holder 100 according to the second embodiment of the present invention may further include a guide part 105.

The guide part 105 may extend from the outer peripheral surface of the upper end portion of the connection body 123 of the connector 102 and may be thus located parallel with the body 103. In a state where the cable 20 passes through the body 103 and the body 103 is separably coupled to the connector 102, the guide part 105 may be located along the circumferential directions of the cable 20 and the body 103 to support the cable 20 and the body 103. Further, the guide part 105 may include a guide base 151, a guide wire 153, and a support guide 155.

The guide base 151 may have the shape of a bar and may extend from the outer peripheral surface of the connection body 123 above the coupling space portion 123' in the same direction as the coupling opening 123". A first end surface of the guide base 151 may fixedly come into contact with the outer peripheral surface of the upper end portion of the connection body 123. In a state where the first end portion of the mounting body 131 of the body 103 is inserted into the coupling space portion 123', the second end portion of the mounting body 131, which is opposite to the first end portion of the mounting body 131, may be located under the guide base 151. That is, a length of the guide base 151 may longer than that of the mounting body 131 protruding from the coupling space portion 123'.

The guide wire 153 may have a given length, and a portion of the guide wire 153 may be located over the guide base 151. Further, a first end portion of the guide wire 153 may be located on the underside of the guide base 151 to move along the circumferential direction of the middle portion of the mounting body 131, and a second end portion of the guide wire 153, which is opposite to the first end portion of the guide wire 153, may be movable along the interior of the guide base 151 and may protrude from a second end surface of the guide base 151. In this case, a first end of the guide wire 153 may be fixed to the underside of the first end portion of the guide base 151, and a second end of the guide wire 153, which is opposite to the first end of the guide wire 153, may be located under the second end surface of the guide base 151.

Further, the guide base 151 may have a pair of guide rolls 150a located at the inside thereof, and the guide rolls 150a may be spaced apart from each other to support the guide wire 153 located inside the guide base 151, while being rotated by the movement of the guide wire 153.

The support guide 155 may have the shape of a circular band and be made of an elastic material such as rubber, silicone, or the like. The second end of the guide wire 153 may be fixedly connected to the outer peripheral surface of the support guide 155. In this case, the support guide 155 may be located under the second end surface of the guide base 151.

Under the above-mentioned configuration, the guide part 105 may operate as follows.

In a state where the base 101 is attached to the underside of the monitor 10, the first end portion of the mounting body 131 of the body 103 may be inserted into the coupling space portion 123' (See FIG. 5A), and the first end portion of the guide wire 153 may be located along the circumferential direction of the mounting body 131 in a state of being spaced apart from the outer peripheral surface of the mounting body 131. Further, the support guide 155 may face the second end surface of the mounting body 131, while being spaced apart therefrom.

In the state where the base 101 is attached to the underside of the monitor 10, further, the cable 20 may pass through the support guide 155 and the mounting body 131 through the mounting space 131', and the first end portion of the mounting body 131 may be inserted into the coupling space portion 123' (See FIG. 5B). In this case, the cable 20 protruding from the second end surface of the mounting body 131 may sag down. At this time, the support guide 155 may move down by means of the cable 20 to pull down the second end portion of the guide wire 153 so that the second end portion of the guide wire 153 may protrude longer from the second end surface of the guide base 151. Further, the first end portion of the guide wire 153 may be more inserted into the guide base 151 by means of the second end portion of the guide wire 153 and may move close to the outer peripheral surface of the mounting body 131. In a state where the first end portion of the guide wire 153 comes into contact with the outer peripheral surface of the mounting body 131, it may located along the circumferential direction of the mounting body 131. As a result, the guide part 105 may support the mounting body 131 to prevent the mounting body 131 from moving down owing to the cable 20 sagging down. According to the second embodiment of the present invention, the cable holder 100 may have the guide part 105 for preventing the mounting body 131 from being damaged due to the load of the cable 20 on the coupled portion between the mounting body 131 of the body 103 and the connection body 123 of the connector 102 or preventing the mounting body 131 from escaping from the connection body 123.

As described above, the cable holder according to the present invention has the following advantages.

Firstly, the cable holder can minimize the contact of the cable of the mouse with another object.

Secondly, the cable holder can reduce the tension applied to the cable when the mouse moves, thereby enabling the cable to be kept stably at the mounted state thereonto.

Lastly, the cable holder can allow the mouse to freely move in an extended motion range.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A cable holder comprising:
    a base including:
        a flat top;
        a cylindrical base body having a cylindrical connection space portion concavely formed on top thereof, a circular connection opening formed on underside thereof to have an inner diameter smaller than an inner diameter of the connection space portion, and a disc-shaped cover space portion formed on top of the connection space portion to have an inner diameter larger than the inner diameter of the connection space portion; and
        a pair of base auxiliary bodies having shapes of rods and extending from an outer peripheral surface of an upper end portion of the base body in such a manner as to be located on the same line as each other, top of the base body and tops of the base auxiliary bodies being located on the same plane;
    a connector connected to the underside of the base that is opposite to the top of the base and rotatable around the base; and
    a body inserted into the connector and separably coupled to the connector to pass a cable therethrough.

2. The cable holder according to claim 1, wherein the connector comprises:
    a rotation inducing body having the shape of a ball bearing with a hollow portion and accommodated in the connection space portion; and
    a connection body having the shape of a cylinder corresponding to the base body, connected to the rotation inducing body and thus located on the underside of the base body, and separably coupling the body thereto, the connection body being rotatable around the base body.

3. The cable holder according to claim 2, wherein the connection body comprises connection inducing bodies protruding from top thereof and spaced apart from each other in parallel with each other, and the connection inducing bodies pass through the connection opening and are inserted into the hollow portion of the rotation inducing body and coupled to the rotation inducing body, so that top of the connection body comes into contact with the underside of the base body, and the connection body rotates around the connection inducing bodies.

4. The cable holder according to claim 2, wherein the connection body comprises a coupling space portion formed therein to pass through the outer peripheral surface of a lower end portion thereof and a coupling opening formed on the underside thereof and thus connected to the coupling space portion, and the body comprises:
    a tube-shaped mounting body passing through the coupling space portion and having a mounting space portion formed therein to pass through both ends of the mounting body in such a manner as to pass the cable therethrough and a mounting opening formed along the mounting space portion on the outer peripheral surface of the mounting body and thus connected to the mounting space portion;
    a coupling inducing body protruding from the outer peripheral surface of a first end portion of the mounting body in such a way as to be located on an opposite side to the mounting opening; and
    a pair of coupling auxiliary bodies spaced apart from each other and protruding from the outer peripheral surface of the mounting body in a circumferential direction of the mounting body to connect both sides of the coupling inducing body,
    whereby when the first end portion of the mounting body is inserted into the coupling space portion, the coupling inducing body is fixedly inserted into the coupling opening, and the coupling auxiliary bodies come into contact with the inner sides of the coupling opening.

5. The cable holder according to claim 4, wherein the body is made of an elastic material and when the cable passes through the mounting opening, the body is deformed in such a way as to increase a width of the mounting opening.

6. The cable holder according to claim 2, wherein the base further comprises a disc-shaped base cover inserted into the cover space portion and thus located on a bottom of the cover space portion, so that in a state where the rotation inducing body is accommodated in the connection space portion, the base cover is located on the bottom of the cover space portion and the top of the rotation inducing body, and the base auxiliary bodies comprise plate-shaped auxiliary space portions concavely formed on tops thereof, connected to the cover space portion, and having the undersides located higher than the bottom of the cover space portion, so that when the base cover is located on the bottom of the cover space portion, top of the base cover is located on the same plane with the undersides of the auxiliary space portions.

7. The cable holder according to claim 1, further comprising an installation part located on top of the base and having given adhesion to allow the base to be fixed to the underside of a monitor, whereby the cable passes through the body coupled to the connector, is spaced apart from top of an object on which the monitor is installed, and movable along the body or rotates around the base.

8. The cable holder according to claim 5, further comprising a guide part extending from the outer peripheral surface of the upper end portion of the connection body and located parallel with the body, whereby in a state where the cable passes through the body and the body is separably coupled to the connector, the guide part is located along the circumferential directions of the cable and the body to support the cable and the body through the contact with the body from a state of being spaced apart from the body.

9. The cable holder according to claim 8, wherein the guide part comprises:
    a bar-shaped guide base having a first end surface fixedly coming into contact with the outer peripheral surface of the connection body above the coupling space portion, extending from the outer peripheral surface of the upper end portion of the connection body, and located in the same direction as the coupling opening;
    a guide wire having a given length and configured to have a first end fixed to the underside of the guide base, a first end portion located on the underside of the guide base to move along the circumferential direction of a middle portion of the mounting body, and a second end portion opposite to the first end portion in such a way as to be movable along the interior of the guide base and protrude from a second end surface of the guide base opposite to the first end surface of the guide base; and a support guide made of an elastic material, having the shape of a circular band, and connecting a second end of the guide wire to the outer peripheral surface thereof, whereby in a state where the base is attached to the underside of a monitor, the first end portion of the mounting body of the body is inserted into the coupling space portion to allow the first end portion of the guide wire to be located along the circumferential direction of the mounting body in a state of being spaced apart from the outer peripheral surface of the mounting body and to allow the support guide to be spaced apart from the second end surface of the mounting body, while facing the second end surface of the mounting body, and in the state where the cable passes through the support guide and the mounting body through the mounting space portion and the first end portion of the mounting body is inserted into the coupling space portion, the cable protruding from the second end surface of the mounting body sags down to allow the support guide to move down by means of the cable to thus pull down the second end portion of the guide wire in such a way that the second end portion of the guide wire protrudes longer from the second end surface of the guide base and the first end portion of the guide wire is more inserted into the guide base by means of the second end portion of the guide wire and thus comes into contact with the outer peripheral surface of the mounting body in such a way as to be located along the circumferential direction of the mounting body.

10. A cable holder comprising:
a base including:
   a top;
   a base body having a connection space portion formed on top thereof, a connection opening formed on an underside thereof, and a cover space portion formed on top of the connection space portion to have an inner diameter larger than an inner diameter of the connection space portion; and
   a pair of base auxiliary bodies extending in an opposing direction, a top of the base and a top of each of the pair of auxiliary bodies being located in the same plane;
a connector rotatably connected to an underside of the base; and
a body inserted into the connector and separably coupled to the connector to pass a cable therethrough.

11. The cable holder of claim 10, wherein the top is flat.

12. The cable holder of claim 10, wherein the connector includes at least one connection inducing body.

13. The cable holder of claim 10, wherein the connector includes at least one protrusion.

14. The cable holder of claim 10, wherein the cable holder is configured to be coupled to a monitor.

15. The cable holder of claim 10, wherein the connector is selectively rotatable in each of a clockwise and a counter-clockwise direction.

16. The cable holder of claim 10, further comprising an installation part for adhesively coupling the cable holder to a surface.

* * * * *